(12) United States Patent
Kawaguchi (10) Patent No.: US 9,442,905 B1
(45) Date of Patent: Sep. 13, 2016

(54) DETECTING NEIGHBORHOODS FROM GEOCODED WEB DOCUMENTS

(71) Applicant: Google Inc., Mountain View, CA (US)

(72) Inventor: Ryo Kawaguchi, Meguro-ku (JP)

(73) Assignee: GOOGLE INC., Mountain View, CA (US)

(*) Notice: Subject to any disclaimer, the term of this patent is extended or adjusted under 35 U.S.C. 154(b) by 264 days.

(21) Appl. No.: 13/930,631

(22) Filed: Jun. 28, 2013

(51) Int. Cl.
*G06F 17/30* (2006.01)
*G06F 17/22* (2006.01)
*G06F 17/27* (2006.01)

(52) U.S. Cl.
CPC ......... *G06F 17/2247* (2013.01); *G06F 17/272* (2013.01); *G06F 17/2705* (2013.01); *G06F 17/3089* (2013.01); *G06F 17/30864* (2013.01)

(58) Field of Classification Search
CPC ........... G06F 17/2247; G06F 17/2705; G06F 17/272; G06F 17/30864; G06F 7/3089; G06F 17/30386
USPC ................................................ 707/755, 736
See application file for complete search history.

(56) References Cited

U.S. PATENT DOCUMENTS

| | | | |
|---|---|---|---|
| 7,319,994 B1* | 1/2008 | Sercinoglu | |
| 7,349,892 B1* | 3/2008 | Virdy | |
| 7,904,333 B1* | 3/2011 | Perkowski | 705/14.4 |
| 2003/0061211 A1* | 3/2003 | Shultz et al. | 707/3 |
| 2006/0002189 A1* | 1/2006 | Berkman | 365/185.2 |
| 2006/0026152 A1* | 2/2006 | Zeng | G06F 17/30864 707/723 |
| 2006/0184500 A1* | 8/2006 | Najork | G06F 17/30864 707/705 |
| 2007/0233656 A1* | 10/2007 | Bunescu et al. | 707/3 |
| 2008/0010605 A1 | 1/2008 | Frank | |
| 2008/0052638 A1* | 2/2008 | Frank et al. | 715/808 |
| 2008/0140348 A1* | 6/2008 | Frank | 702/181 |
| 2008/0306908 A1* | 12/2008 | Agrawal et al. | 707/3 |
| 2009/0132483 A1* | 5/2009 | Yang | G06F 17/30241 707/769 |
| 2011/0096174 A1* | 4/2011 | King et al. | 348/207.1 |
| 2011/0280453 A1 | 11/2011 | Chen et al. | |
| 2013/0031458 A1* | 1/2013 | Java | G06F 17/3087 715/234 |
| 2013/0328882 A1* | 12/2013 | Pirwani et al. | 345/441 |

OTHER PUBLICATIONS

Zeng et al., Learning to cluster web search results, 2004, ACM, pp. 210-217.*
en.wikipedia.org/wiki/Alpha_shape; Aug. 28, 2012.
en.wikipedia.org/wiki/Convex_hull_algorithms; Aug. 28, 2012.
en.wikipedia.org/wiki/DBSCAN; May 15, 2013.
en.wikipedia.org/wiki/Tokenization; Aug. 28, 2012.
US Unpublished U.S. Appl. No. 13/604,401.

* cited by examiner

*Primary Examiner* — Shahid Alam
*Assistant Examiner* — Andrew N Ho
(74) *Attorney, Agent, or Firm* — Marshall, Gerstein & Borun LLP (57) ABSTRACT

Provided is a process of identifying a name and boundary of a neighborhood based on web documents, the process including: extracting, via one or more processors, an n-gram appearing in a plurality of web documents; associating the n-gram with geographic locations associated with the web documents from which the n-gram was extracted; identifying a neighborhood by identifying a cluster of geographic locations associated with the n-gram; determining a boundary for the neighborhood from the distribution of geographical locations in the cluster; determining a name for the neighborhood from the n-gram; and adding the name and boundary of the neighborhood to a geographic information system.

14 Claims, 3 Drawing Sheets

DETECTING NEIGHBORHOODS FROM GEOCODED WEB DOCUMENTS

BACKGROUND

1. Field

The present invention relates generally to machine learning and, more specifically, to detecting neighborhoods from text in geocoded web documents.

2. Description of the Related Art

Geographic information systems are generally used for a number of purposes, including to store, organize, and provide information about geographic areas. Examples of information stored in geographic information systems include names and geographic locations of geographically distributed entities, such as streets, points of interest, businesses, natural features, neighborhoods, cities, counties, states, provinces, countries, and the like. Geographic information systems are used in a variety of contexts, including identifying features to be displayed in interactive online maps, navigation systems, and identifying hierarchical relationships between entities (e.g., indicating which neighborhoods are in a city and which businesses are in a neighborhood). This information is used, for instance, by search engines to respond to a search query for a particular type of restaurant within a neighborhood named in the query, or by an interactive map to identify points of interest within an area being displayed.

Updating and populating records in geographic information systems is relatively expensive and difficult, particularly for systems describing larger areas, like an entire country in relatively fine detail, e.g., at the level of neighborhoods or local businesses. Over time, the names of neighborhoods change, and new neighborhoods are named. Often, among those living within an area, new names for geographic areas will emerge without an official body defining names or boundaries of those areas. For instance, a new name of a neighborhood may arise from the attributes of a relatively small area changing, such as a collection of similar businesses moving into an area, creating, for instance, a new restaurant district or fashion district. Or locals may develop colloquial names for areas by shortening formal names in unpredictable fashions. As new names arise, often frequently and describing a large number of relatively small neighborhoods, documenting the newly named areas can be difficult. At larger scales, such as spanning an entire country or the planet, manually cataloging new neighborhoods with human surveyors is generally prohibitively expensive due to the size of the area, frequency with which new neighborhood names arise, and number of languages in which areas are described.

SUMMARY

The following is a non-exhaustive listing of some aspects of the present techniques, the aspects being listed as enumerated embodiments for cross referencing between descriptions. These and other aspects are described in the following disclosure.

1. A process of identifying a name and boundary of a neighborhood based on web documents, the process including: extracting, via one or more processors, an n-gram appearing in a plurality of web documents; associating the n-gram with geographic locations associated with the web documents from which the n-gram was extracted; identifying a neighborhood by identifying a cluster of geographic locations associated with the n-gram; determining a boundary for the neighborhood from the distribution of geographical locations in the cluster; determining a name for the neighborhood from the n-gram; and adding the name and boundary of the neighborhood to a geographic information system.

2. The process of embodiment 1, wherein determining the name for the neighborhood from the n-gram includes removing stop-words from the n-gram.

3. The process of any of embodiments 1-2, wherein clustering of the geographical locations associated with the n-gram is performed using a density-based spatial clustering of applications with noise (DBSCAN) algorithm.

4. The process of any of embodiments 1-3, wherein identifying the neighborhood includes determining that the identified cluster contains at least a threshold amount of geographic locations.

5. The process of any of embodiments 1-4, wherein identifying the neighborhood includes determining that the identified cluster defines an area less than a threshold area such that false positives arising from single building having multiple geographic entities is less likely to be identified as a neighborhood.

6. The process of any of embodiments 1-5, wherein identifying the neighborhood includes determining that the identified cluster defines a density of geographic locations that is greater than a threshold density.

7. The process of any of embodiments 1-6, wherein identifying the neighborhood includes determining that the identified cluster is one cluster among a number of identified clusters, wherein the number is less than a threshold amount of neighborhoods.

8. The process of any of embodiments 1-7, wherein identifying the neighborhood includes determining that an amount of outliers to the identified cluster is less than a threshold amount.

9. The process of embodiment 8, wherein the threshold amount is based on a ratio of points determined to be in a cluster to points determined not to be in a cluster.

10. The process of any of embodiments 1-9, wherein determining the name for the neighborhood from the n-gram includes: identifying a plurality of candidate names of geographic areas that overlap the neighborhood; ranking the candidate names; and selecting the name for the neighborhood based on the ranking.

11. The process of embodiment 10, wherein ranking the candidate names includes: ranking the candidate names based on a frequency with which the candidate names appear in web documents.

12. The process of any of embodiments 1-11, wherein determining the boundary for the neighborhood from the distribution of geographical locations in the cluster includes: determining an alpha shape of the geographic locations in the cluster.

13. The process of any of embodiments 1-11, wherein determining the boundary for the neighborhood from the distribution of geographical locations in the cluster includes: determining a convex hull of the geographic locations in the cluster.

14. The process of any of embodiments 1-13, wherein extracting the n-gram appearing in the plurality of web documents includes: extracting n-grams of a plurality of different lengths and less than a threshold length from the web documents.

15. The process of any of embodiments 1-14, wherein identifying the neighborhood by identifying the cluster of geographic locations associated with the n-gram includes: determining parameters of a clustering algorithm based on a geographic density associated with a geographic region including at least some of the geographic locations.

16. The process of any of embodiments 1-15, wherein identifying the neighborhood by identifying the cluster of geographic locations associated with the n-gram includes: determining that the n-gram includes or is modified by a term associated with geographic locations in a language in which the n-gram is expressed.

17. The process of any of embodiments 1-16, wherein: extracting, via one or more processors, the n-gram appearing in the plurality of web documents includes: obtaining a plurality of web documents, each web document being associated with a respective geographic location, the web documents including user reviews of local businesses associated with the respective geographic locations in the geographic information system; and extracting n-grams from each of the web documents, the n-grams including each n-gram of less than a threshold word count; associating the n-gram with geographic locations associated with the web documents from which the n-gram was extracted includes: associating the each of the n-grams with a respective latitude and longitude coordinate of the web document from which the n-grams were extracted; identifying the neighborhood by identifying the cluster of geographic locations associated with the n-gram includes: filtering from the n-grams s; filtering from the n-grams phrases occurring in the web documents less than a threshold amount; filtering from the n-grams at least some n-grams that do not correspond with a cluster; filtering from the n-grams at least some n-grams that correspond to more than a threshold amount of clusters; filtering from the n-grams at least some n-grams that correspond to more than a threshold amount of geographic locations outside of a cluster; determining the boundary for the neighborhood from the distribution of geographical locations in the cluster includes: determining a convex hull of the cluster by identifying geographic locations of vertices of a polygon that contains at least a substantial portion of the cluster; determining the name for the neighborhood from the n-gram includes: designating the n-gram as a candidate name for the geographic area defined by the polygon; identifying one or more candidate names for geographic areas at least partially overlapping the polygon; ranking the candidate names based on an amount of times the name appears in the web documents and the size of the geographic areas at least partially overlapping the polygon; and selecting the highest ranking candidate name as the name; and adding the name and boundary of the neighborhood to the geographic information system includes: storing the name in memory in a record that associates the name with the geographic area defined by the boundary.

18. The process of any of embodiments 1-17, including: receiving a search query including the name; identifying a geographic area defined by the boundary based on an association with the name in the geographic information system; ranking search results based on the geographic area; selecting an advertisement based on the name or the geographic area; and sending the advertisement and the search result.

19. A tangible, non-transitory, machine-readable medium storing instructions that when executed by a data processing apparatus cause the data processing apparatus to perform operations including the processes of any of embodiments 1-18.

20. A system, including: one or more processors; and memory storing instructions that when executed by the processors cause the processors to effectuate operations including the processes of any of embodiments 1-18.

BRIEF DESCRIPTION OF THE DRAWINGS

The above-mentioned aspects and other aspects of the present techniques will be better understood when the present application is read in view of the following figures in which like numbers indicate similar or identical elements.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Figure 1:
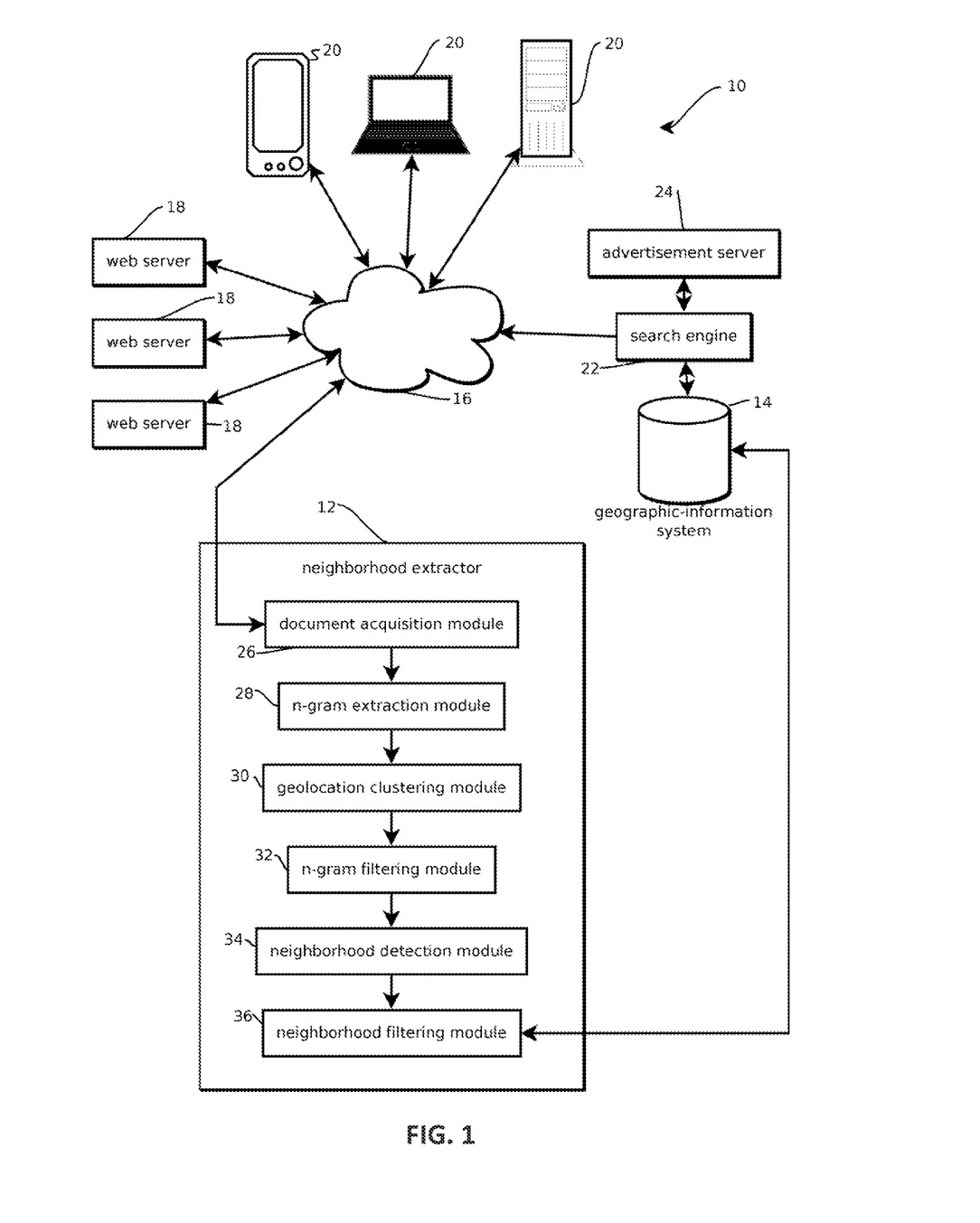
FIG. 1 is a block diagram of a computing environment having a neighborhood extractor.

FIG. 1 shows an example of a computing environment 10 having a neighborhood extractor 12 configured to extract the names and boundaries of neighborhoods from web documents. In this example, the extracted information is used to update a geographic information system 14. Embodiments of the neighborhood extractor 12 obtain a corpus of geocoded web documents over the Internet 16 and identify neighborhoods by location (e.g., by neighborhood boundaries) and name based on geographic clusters of locations associated with web documents that mention the neighborhood name. Further, some embodiments identify neighborhoods in a language agnostic fashion, without reference to predicates or other parts of speech specific to a given language that signal the name of a place. And some embodiments are operative to detect neighborhoods with little or no human intervention, thereby identifying new neighborhoods relatively quickly, relatively inexpensively, and over relatively large geographic areas, potential encompassing areas in which different languages are used.

For example, some embodiments obtain online reviews of local businesses (or other web documents, examples of which are described below). The text of each review may be associated with the latitude and longitude of the business. Some embodiments extract from the text of each review all n-grams of less than a threshold length, such as five words. For instance, if a particular review states "best dim sum in Chinatown," embodiments may extract the following n-grams: "best," "dim," "sum," "in," "Chinatown," "best dim," "dim sum," "sum in," "in Chinatown," "best dim sum," "dim sum in," "sum in Chinatown," "best dim sum in," "dim sum in Chinatown," and "best dim sum in Chinatown." The resulting n-grams of this example are all associated with the location of the restaurant, and similar steps may be performed for each of a large number of other reviews of other geographically distributed businesses.

Next, embodiments detect clusters of the geographic locations associated with given n-grams. For instance, the term "Chinatown" would likely be associated with geographic clusters in a number of cities in which a Chinatown neighborhood is found, while the terms "dim sum in" or "best" would likely be more widely distributed. Thus, the geographic clusters signal that the associated term is potentially a neighborhood name, and the dimensions of the cluster are used in some embodiments to define a likely boundary of the neighborhood.

Some embodiments also filter the n-grams to remove potentially extraneous signals, removing, for example, s, terms that do not form any clusters, terms that form too many clusters, terms that have too many outliers from the geographic clusters, and the like. Further, some embodiments detect when multiple candidate names for an overlapping geographic area occur, e.g., in the case of conflicting neighborhood names, and rank the candidate names to select the more popular name for the geographic area. The resulting names and neighborhood boundaries are, in some embodiments, then added to the geographic information system 14, as described in greater detail below.

As shown in FIG. 1, some embodiments of the neighborhood extractor 12 communicate with a computing environment 10 having a number of other devices connected to the Internet 16. These connections may include various other networks, such as local-area networks, wireless area networks, cellular networks, personal area networks, and the like, through which the components of the computing environment 10 communicate with one another. In this example, computing environment 10 further includes third-party web servers 18, user devices 20, a search engine 22, and an advertisement server 24. The web servers 18 host web documents that, in some cases, are or can be associated with a geographic location and include content from which candidate neighborhood names are extracted. The user devices 20 interact with the web servers 18 to view or provide content in web documents, for example, providing the text of reviews, blogs, articles, or the like. User devices, in some cases, interact with the search engine 22 to search for content relevant to user-submitted queries and view advertisements related to those queries from the advertisement server 24.

In this example, three web servers 18 are shown, but embodiments are consistent with substantially more web servers, for example, a web-scale set of web servers accessible through the World Wide Web and numbering in the millions or tens of millions of devices. The web servers 18 may be operated by different entities and host web documents containing a variety of different types of content. In some cases, the content of the web documents is geolocated with structured data encoded in the web documents, for example a unique identifier of a point of interest, geographic location, or local business corresponding to a record in the geographic information system 14 by which the location is retrieved. Or the web documents may include structured data that explicitly identifies a geographic location without reference to the geographic information system 14, such as a latitude and a longitude encoded in the web documents, e.g., e image file format (EXIF) geolocation fields of photographs with associated prose commentary, potentially mentioning the name of a place. In some cases, the web documents include content from which a geographic location is inferred by, for example, detecting a street address in the web document based on a regular expression or other pattern matching, or by querying the geographic information system 14 with terms in the document to detect mentions of known geographic locations, e.g., mentions of a business, city, street intersection, full address (which may be geocoded by the system 14), or phone number (a location for which may be retrieved from the system 14). Or the web documents may be geocoded with other techniques, for example, by manually classifying the documents.

The web documents may be presented in a variety of formats. In some cases, the web servers 18 host websites having webpages that include one or more web documents, such as a single webpage hosting a single web documents about a single local business that is geocoded to a single geographic location, or a webpage including multiple web documents, each about a different point of interest and geocoded to a different geographic location, e.g., a listing of businesses in a single webpage, where the structure of the document, e.g., as indicated by div boxes or i-frames, indicates which portion of the text corresponds to which business and web document. Examples of websites amenable to geocoding of content include local business review websites, webpages of local businesses including a street address, blogs, news sites, place-pages hosted by web services providers for local businesses, business websites, or other human or machine readable documents that are or can be associated with a particular geographic location and include text in which a neighborhood name is potentially mentioned.

In some cases, web documents hosted by the web servers 18 are accessed or updated by users operating user devices 20, of which three are illustrated as an example, but embodiments are consistent with substantially more, for example, hundreds of millions of user devices 20. As illustrated, user devices 20 may take a variety of forms, and some of the user devices 28 include mobile user devices, such as smart phones or tablets, and other user devices 20 include laptops and desktop computers. In some cases, users opt to provide geolocation data with content submitted by the user devices 20, for example, geolocations sensed with a global positioning system (GPS) location sensor of a smart phone, or geolocations inferred from an Internet Protocol (IP) address of the device, and associated content is designated as corresponding to the provided geolocation.

In situations in which the systems discussed here collect personal information about users, or may make use of personal information, the users may be provided with an opportunity to control whether programs or features collect user information (e.g., information about a user's social network, social actions or activities, preferences, or current location), or to control whether and/or how such information is used (e.g., to provide content that may be more relevant to the user). In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level) so that a particular location of a user cannot be determined. Thus, the user may have control over how information is collected about the user, stored, and used by a content server.

User devices 20, in some cases, also interact with search engine 22 to search for web content or information in the geographic information system 14. For example, the search engine 22 may be operative to receive queries expressed in text or audio, identify terms within the query corresponding to geographic areas by searching for the terms in the geographic information system 14, and return search results corresponding to the identified area, e.g., search results for automotive shops in a specified city. In another example, the search engine 22 includes an interactive map interface by which users are presented with a map displaying a geographic area and including content from the geographic information system 14, e.g., points of interest responsive to a user query submitted through the interactive map.

In some cases, information from the search engine 22 is augmented with advertisements selected by the advertisement server 24 based on geographic locations identified with reference to the geographic information system 14. For instance, a user may search for "restaurants near Springfield," and the search engine 22 may determine that the term "Springfield" corresponds to a geographic area having a record in the geographic information system 14. In response, the search engine 22 may query the geographic information system 14 for local businesses in the category of restaurants within the geographic area of "Springfield" and request advertisements from the advertisement server 24 associated with or relevant to this area, e.g., advertisements for which advertisers have specified bids to have their ads shown in response to a query relating to the geographic area.

The geographic information system 14, in some embodiments, includes a collection of geographic-entity records, each record corresponding to a geographically positioned entity, for example a geographic area, a point of interest, a local businesses, a street, a lake, a municipal or national boundary, or the like. In some cases, the entities are transient, such as weather or traffic. Each geographic-entity record may be associated with a unique identifier, one or more names by which the geographic entity is known to users (e.g., a number of names each associated with a respective popularity score), attributes of the entity (e.g., members of a taxonomy of geographic places, such as a hierarchy of categories of local businesses, like the category of restaurants, which includes Italian restaurants, and which includes pizza places), and hierarchical relationships with other entities indicating, for example, which businesses are in which neighborhood, which neighborhoods are in which cities, which cities are in which states, and which states are in which countries. Further, records may include a geographic location at which the entity is located, for example, a latitude and longitude, or boundaries of a geographic area, for instance, described by latitudes and longitudes of the vertices of a polygon bounding the area. Some embodiments of the geographic information system 14 are operative to receive the name of a geographic area, determine the location of the geographic area, and identify other entities within the geographic area, or vice versa.

Records in the geographic information system 14 are updated and augmented by the neighborhood extractor 12 of this embodiment. As new neighborhoods arise, either from development, shifting demographics, or changes in the names by which geographic areas are colloquially known, or when new web documents are generated (as neighborhoods may not appear or disappear frequently, but the shape may change, and neighborhoods shape may be refined as new web documents indicate shifting boundaries). In some applications, embodiments of the neighborhood extractor 12 infer the name and the corresponding geographic area from geographic clusters of web documents mentioning the name of the neighborhood.

In this example, the neighborhood extractor 12 includes a document acquisition module 26, an n-gram extraction module 28, a geolocation clustering module 30, an n-gram filtering module 32, a neighborhood detection module 34, and a neighborhood filtering module 36. These components, in some cases, parse web documents into overlapping n-grams of various sizes, maintaining the association with the geographic locations of the web documents, and then ascertain whether any of the n-grams are associated with locations that constitute geographic clusters indicative of a neighborhood potentially having the n-gram as a name. Various filtering steps, in some cases, reduce the likelihood of false positives, and a new neighborhood name is inferred from the geographic cluster, while the boundaries of the neighborhood are inferred from the distribution of geographic locations constituting the cluster. The resulting name and corresponding geographic area are added to the geographic information system 14, thereby updating the geographic information system 14 to include a record identifying the newly detected neighborhood.

In this embodiment, the document acquisition module 26 is operative to obtain web documents from the web servers 18. Obtaining the web documents may include crawling the World Wide Web, querying application program interfaces of web services, or retrieving a corpus of web documents captured through these or other means, e.g., by purchasing a corpus from a third party. The web documents, in some cases, are each associated with a geographic location obtained with the web document, or some embodiments geocode the web documents, for example, assigning a location based on detection of street addresses in the web documents or determining that the document references a business at a location indicated by the geographic information system 14. In some cases, each web documents is associated with one geographic location expressed as a latitude and a longitude coordinate, but a variety of other encodings of geographic location are consistent with the present techniques, including identifiers of unit tiles of geographic areas and relative encodings of geographic locations. And in some cases, retrieved content from a single webpage may reference multiple geographic locations, and such content may be partitioned by section addressing different geographic location (e.g., based on the HTML structure, such as based on repeating patterns of text, i-frames, or div boxes), each section corresponding to a different web document for purposes of geocoding.

The document acquisition module 26, in some cases, fully renders webpages and extracts from the rendered webpages visible text to capture text obtained through execution of scripts, such from JavaScript XMLHttpRequests for data to populate a web document client-side, or some embodiments may capture raw un-rendered HTML or other encodings of web documents and use clustering and filtering to remove markup commands and script text. As noted above, the term "web documents" refers to documents that are or can be associated with a geographic location, include content that potentially expresses the name of the neighborhood, and, in some cases, are accessible via the Internet 16. Thus, web documents are not limited to webpages and may include other forms of text (e.g., a corpus of newspaper stories or text of books) and various forms of structured data, such as JavaScript object notation, XML, or other serialized data formats by which content is provided to webpages, special-purpose applications, or computing devices making application program interface calls.

The obtained web documents, in some embodiments, are advanced to the n-gram extraction module 28, which may be operative to extract n-grams from the web documents. In some cases, n-grams of various sizes are extracted, for example, each n-gram of less than a threshold length, for instance, n-grams of less than or equal to three words for relatively fast processing, of less than or equal to five words to balance between speed and recognition of relatively long neighborhood names, or less than or equal to 10 words to capture relatively long neighborhood names at the expense of more processing time and memory consumption. Thus, some embodiments extract each n-gram from a given web document of length one, two, three, four, and five words, with, for instance, the n-grams overlapping one another. Consequently, even relatively short web documents produce a relatively large number of n-grams.

To conserve memory, as n-grams are extracted, embodiments may determine whether the extracted n-gram has already been extracted, either from the current document or another document, and if so, add the geolocation of the current document to a list of geolocations associated with the n-gram. Otherwise, a new n-gram record may be created, listing the one location for the current web document. To speed identification of previously extracted n-grams, embodiments may store a list of n-grams, each associated with a list of geolocations, in sorted order, e.g., alphabetically, to facilitate binary searches for n-grams. Or embodiments may use other data structures to expedite n-gram matching, e.g., a tie, or prefix tree.

Each of the extracted n-grams, in some embodiments, is associated with the geographic locations of the web documents in which the n-gram was detected, forming, for instance, a set of geolocations corresponding to the n-gram of "best restaurant," a set corresponding to the n-gram of "restaurant in Chinatown," and a set corresponding to the n-gram of "Chinatown," to select a few examples.

The resulting n-grams and the associated geographic locations are then advanced to the geolocation clustering module 30 which, in some embodiments, is operative to detect for each n-gram, clusters of geographic locations of web documents including that n-gram. In one example, the n-gram of "best restaurant" may be associated with several hundred thousand geographic locations of web documents including this phrase, and those geographic locations may be distributed relatively broadly and uniformly. In contrast, the n-gram of "Chinatown" may be associated with a smaller number of geographic locations that are relatively tightly grouped geographically in clusters corresponding to Chinatowns in certain cities, for instance, in San Francisco, Lima, and New York. These different geographic distributions are categorized by the geolocation clustering module 30, which in some embodiments, is operative to detect whether a n-gram is associated with geographic locations that form one or more clusters and identify, or otherwise distinguish, those clusters, producing, for instance, for each n-gram, a list of identified clusters, each identified cluster having identifiers of the geolocations of the n-gram in that cluster.

A variety of different clustering algorithms are consistent with the present techniques and may be selected based on various engineering, processing time, false-positive rate, false-negative rate, memory consumption, and cost tradeoffs. In some cases, clusters are detected with a density-based spatial clustering of applications with noise (DBSCAN) algorithm, which is often resilient to outlier points that might lead to false positives or false negatives potentially exhibited by certain other clustering algorithms.

In some cases, a parameter of the DBSCAN (or other) algorithm is a minimum points threshold number of geographic locations required to qualify as a cluster. The minimum points threshold may be selected to be greater than five points to reduce the risk of false negatives in relatively sparse data sets, greater than 20 points to reduce the risk of false positives in relatively voluminous data sets, or approximately equal to 10 points for a balance between these tradeoffs.

The DBSCAN algorithm also includes a parameter "epsilon," which specifies the geographic density required for a collection of points to constitute a cluster. The value of epsilon may be selected to be smaller than 50 meters to reduce the risk of false positives in relatively high geographic density data sets with relatively high location accuracy, greater than 500 meters to reduce the risk of false negatives in relatively sparse data sets with potentially lower location accuracy, or approximately equal to 200 meters for a balance between these tradeoffs.

Some embodiments adjust the parameters of the clustering algorithm based on attributes of the geographic area under analysis, for example, increasing epsilon and decreasing the minimum points threshold for geographic areas associated with a lower density or smaller data set, or vice versa. In some cases, records of geographic areas in the geographic information system may include parameters for the clustering algorithm or attributes of the geographic area, such as density of geographic features, by which the parameters are dynamically adjusted according to the geographic area in which a collection of geolocations is disposed.

Other examples of clustering algorithms consistent with the present techniques include the generalized DBSCAN algorithm, the ordered points to identify the clustering structure (OPTICS) algorithm, various centroid-based clustering algorithms (such as K-means clustering), various distribution-based clustering algorithms (e.g., expectation-maximization clustering), various density-based clustering algorithms (including the DBSCAN algorithm), or other clustering algorithms, including the canopy clustering algorithm for relatively large data sets, which may be used as a preprocessing clustering in combination with one of the above-mentioned algorithms.

The geolocation clustering module 30, in some embodiments, outputs a set of cluster-forming n-grams, each such n-gram being associated with the geographic locations of web documents in which it was found, and one or more candidate neighborhoods corresponding to a geographic cluster of the locations. Thus, a single n-gram may be associated with multiple clusters in some cases, and each cluster may correspond to a candidate neighborhood.

In some embodiments, the candidate neighborhoods are detected in a language-agnostic manner, without reference to language-specific parts of speech, thereby detecting neighborhoods potentially worldwide without incurring the cost or burden of employing native speakers. Some embodiments, however, augment or replace some of the present techniques with language-specific natural language processing to detect indicators of neighborhoods. For example, in English, the term "neighborhood" is often preceded by a name of a neighborhood, or the term "near" or "within" often precedes a neighborhood name. In some cases, the language of web documents is detected, corresponding indicators of neighborhood names are retrieved along with syntactic relationships with place names, and terms associated with such an indicator are selected as candidate neighborhood names with natural language processing.

In some embodiments, the n-grams are filtered by the n-gram filtering module 32. In some cases, some filtering steps may occur before clustering, and some filtering steps may occur after, depending upon the type of filtering and the desired effect on the cluster analysis. In one example, stop-words, such as "the" and "best," are removed from the n-grams. In some implementations, the stop-words are determined without reference to the language of the web documents, removing, for example, words that appear with greater than a threshold frequency, regardless of their semantic content. In other cases, the language of the web document is detected, and a predetermined list of stop-words corresponding to that language are retrieved for reference when filtering stop-words. In another example, n-grams that occur with less than a threshold frequency are removed from further consideration, thereby eliminating, for example, numerical strings serving as unique identifiers for computing systems. In some cases, terms that correspond to more than a threshold number of clusters are removed from further analysis, for example, the term "downtown," may correspond to a cluster in a relatively large number of cities without corresponding to a particular neighborhood. Similarly, terms that do not correspond to any clusters are also removed from further analysis in some embodiments, thereby removing, for example, terms like "my favorite," that occur relatively frequently but without correspondence to particular geographic areas. In another example, terms that form clusters but have more than a threshold amount (e.g., count or frequency) of outlier points are also removed from further analysis in some embodiments, thereby eliminating terms like "restaurant" that may form clusters in a restaurant district, but also correspond to a relatively large number of locations outside of those areas.

In some cases, the thresholds for the various filters are adjusted, e.g., normalized, based on various attributes of the geographic area. For example, the thresholds may be expressed as a frequency or density relative to the surrounding area rather than an absolute count. In some cases, clusters are also filtered according to geographic characteristics, for example, removing clusters determined to be smaller than a threshold area, as tends to occur for clusters corresponding to a single business. Similarly, clusters larger than a threshold area may also be removed or added to a queue for manual review, as designations for larger areas may warrant the additional expense associated with further manual investigation. In some cases, clusters spanning a geographic area beyond what is walkable, e.g., greater than 25 square kilometers, are removed by filtering.

Following filtering and clustering, some embodiments detect candidate neighborhoods with the neighborhood detection module 34. For each remaining cluster-forming n-gram and the associated geographic cluster (or clusters), the neighborhood detection module 34 infers the geographic extent of the area for the neighborhood corresponding to each cluster based on the distribution of points in the cluster. In some cases, the boundaries of the candidate neighborhood are calculated by applying an alpha shape algorithm or a convex hull, to the geographic locations in a given cluster. In another example, the boundaries are determined by calculating an average density of geographic locations in the cluster over some area, e.g., an average over the surrounding 10,000 square meter area, and then selecting as the boundary an area encompassed by a contour line defined by a threshold average density. The resulting area, in some cases, is encoded as a sequence of vertices of a polygon defining a boundary of the geographic area, such as a sequence of latitude and longitude points corresponding to these vertices. In other examples, the boundaries of the geographic area are defined by sequence of piecewise linear curves or a center point and a radius. The resulting n-gram and defined area are referred to as "candidate neighborhoods."

In some embodiments, the resulting candidate neighborhoods are then filtered by the neighborhood filtering module 34, which may be operative to determine that multiple candidate neighborhoods describe overlapping or approximately coterminous geographic areas and rank the candidate neighborhoods to select the more popular name and more widely recognized boundary. For example, for each candidate neighborhood, embodiments may determine whether that candidate area overlaps with another candidate neighborhood to which it has not yet been compared. Neighborhoods may be deemed to overlap if more than a threshold amount of one neighborhood exists within the other neighborhood, e.g., more than 40% for more fine-grained naming, or more than 80% to detect names more likely to be recognized as a canonical name of an area. Overlapping candidate neighborhoods may then be ranked based on the frequency with which the n-gram, or name, of each candidate neighborhood occurs in the web documents. In some cases, a popularity score is calculated for each candidate neighborhood based on the number of mentions of the candidate neighborhood name divided by the area of the candidate neighborhood determined by the neighborhood detection module 34, and the candidate neighborhoods are ranked according to the popularity score to detect geographically focused neighborhoods and names that are also relatively widely recognized.

The top ranking, or otherwise selected, neighborhood (defined, in this example, at least in part by data indicative of a name and boundary) is then added to the geographic-information system 14 by the neighborhood filtering module 36. In some cases, the geographic-information system 14 is first queried with the name of the neighborhood, the geographic area of the neighborhood, or both, to determine whether the geographic area is already named in the geographic information system 14 or whether the name is already associated with a geographic area. A variety of techniques may be used to reconcile pre-existing records in the geographic information system with detected neighborhoods. For example, neighborhoods may be determined to be potential duplicates in response to a ratio of overlapping geographic areas to non-overlapping geographic areas exceeding a threshold, and a single record in the geographic information system may list both the detected name and the pre-existing name as alternate names of the neighborhood, the neighborhood may be designated with the name having a higher popularity score, or the conflicting names may be submitted to a queue for further review by a human investigator. Or in some cases, the detected polygon may be associated with the matching geographic entity in addition to its political boundary.

Thus, embodiments of the neighborhood extractor 12 automatically update the geographic information system 14 with records potentially describing, relative to what is attainable with many manual surveys, a relatively large number of neighborhoods collectively distributed over a relatively large geographic area by analyzing a relatively large corpus of geocoded web documents. Further, some embodiments detect neighborhoods without reference to language-specific aspects of the web documents, thereby potentially detecting neighborhoods worldwide at relatively low cost. Due to the scale of the analysis, a number of computers may be employed to provide the functionality described above, in some cases, instantiating multiple, concurrent instances of the above-described modules to parallelized aspects of the analysis, for instance, processing different n-grams with different computing devices concurrently. Examples of such computing systems are described below with reference to FIG. 3.

Further, it should be noted that while the components of the neighborhood extractor 12 are described as discrete functional blocks, code or hardware by which these components are implemented may be intermingled, conjoined, subdivided, co-located, distributed, or otherwise differently organized from the arrangement in which they are illustrated. Instructions for providing the functionality described herein may be stored on a tangible, non-transitory, machine-readable medium and those instructions, when executed by a data processing apparatus, may cause the data processing apparatus to effectuate the functionality described herein.

Figure 2:
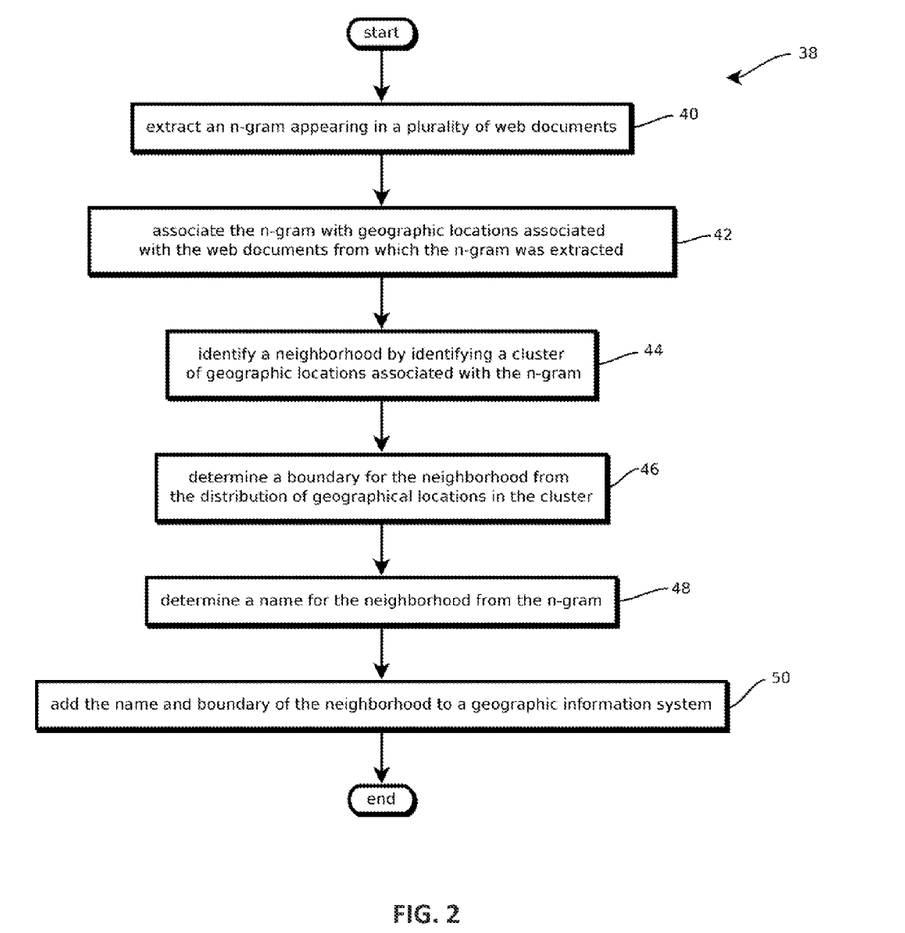
FIG. 2 is a flowchart of a process for extracting names and boundaries of neighborhoods from web documents.

FIG. 2 shows an example of a process 38 for extracting neighborhood names from web documents. The process 38 may be performed by examples of the above described neighborhood extractor 12, though embodiments are not limited to the particular implementation described with reference to FIG. 1. Further, instructions for performing the process 38 may be stored on a tangible, non-transitory, machine-readable medium such that when the instructions are executed by data processing apparatus, the data processing apparatus effectuates the operations of the process 38. Examples of such a data processing apparatus are described below with reference to FIG. 3.

In this embodiment, the process 38 includes extracting an n-gram appearing in a plurality of web documents, as indicated by block 40. This step may be performed by the above-described n-gram extraction module 28. Next, the n-gram is associated with geographic locations associated with the web documents from which the n-gram was extracted, as indicated by block 42. This step may also be performed by the above-described n-gram extraction module 28. Next, in this embodiment, a neighborhood is identified by identifying a cluster of geographic locations associated with the n-gram, as indicated by block 44. This step may be performed by the above-described geolocation clustering module 30. A boundary for the neighborhood may then be determined from the distribution of geographic locations in the cluster, as indicated by block 46, a step which may be performed by the above-described neighborhood detection module 34. Next, in this example, a name for the neighborhood is determined based on the n-gram, as indicated by block 48. In some cases, the n-gram is the name, or some embodiments may remove stop-words from n-gram and designate the resulting phrase as the name. Finally, some embodiments add the name and the boundary of the neighborhood to a geographic information system, as indicated by block 50. This step may be performed by the above-described neighborhood filtering module 36.

Thus, embodiments include processes and systems that detect neighborhood names and boundaries based on geographic clusters of geocoded web documents including the names. As noted above, such detection techniques are expected to be relatively comprehensive, relatively low cost, and relatively responsive to changes in colloquial names for neighborhoods.

Figure 3:
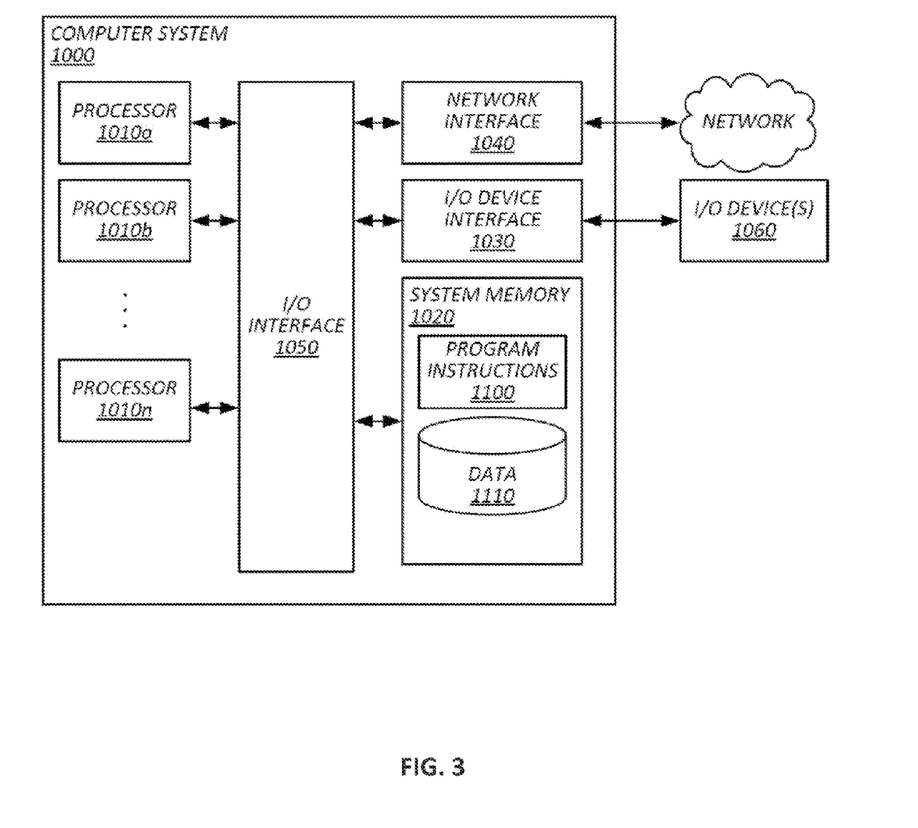
FIG. 3 is an example of a computer system by which the components and processes of the above figures are implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A method of identifying a name and boundary of a neighborhood based on web documents, the method comprising:
   extracting, via one or more processors, n-grams appearing in a plurality of web documents and being of less than a threshold word count:
      obtaining a plurality of web documents, each web document being associated with a respective geographic location, the web documents including user reviews of local businesses associated with the respective geographic locations in the geographic information system,
      extracting n-grams from each of the web documents;
   associating, via the one or more processors, the n-grams with geographic locations associated with the web documents from which the n-grams were extracted, including associating each of the n-grams with a respective latitude and longitude coordinate of the web document from which the n-grams were extracted;
   identifying, via the one or more processors, a neighborhood by identifying a cluster of geographic locations associated with the n-grams, including:
   filtering from the n-grams stop-words,
   filtering from the n-grams phrases occurring in the web documents less than a threshold amount,
   filtering from the n-grams at least some n-grams that do not correspond with a cluster,
   filtering from the n-grams at least some n-grams that correspond to more than a threshold amount of clusters,
   filtering from the n-grams at least some n-grams that correspond to more than a threshold amount of geographic locations outside of a cluster;
   determining, via the one or more processors, a boundary for the neighborhood from the distribution of geographical locations in the cluster, including determining a convex hull of the cluster by identifying geographic locations of vertices of a polygon that contains at least a substantial portion of the cluster;
   determining, via the one or more processors, a name for the neighborhood from the n-gram, including:
      designating the n-gram as a candidate name for the geographic area defined by the polygon,
      identifying one or more candidate names for geographic areas at least partially overlapping the polygon,
      ranking the candidate names based on an amount of times the name appears in the web documents and the size of the geographic areas at least partially overlapping the polygon, and
      selecting the highest ranking candidate name as the name; and
   adding, via the one or more processors, the name and boundary of the neighborhood to a geographic information system, including storing the name in memory in a record that associates the name with the geographic area defined by the boundary.

2. The method of claim 1, wherein identifying the cluster of the geographical locations associated with the n-gram is performed using a density-based spatial clustering of applications with noise (DBSCAN) algorithm.

3. The method of claim 1, wherein identifying the neighborhood further includes determining that the identified cluster contains at least a threshold amount of geographic locations.

4. The method of claim 1, wherein identifying the neighborhood comprises determining that the identified cluster defines an area less than a threshold area.

5. The method of claim 1, wherein identifying the neighborhood comprises determining that the identified cluster defines a density of geographic locations that is greater than a threshold density.

6. The method of claim 1, wherein identifying the neighborhood comprises determining that the identified cluster is one cluster among a number of identified clusters, wherein the number is less than a threshold amount of neighborhoods.

7. The method of claim 1, wherein identifying the neighborhood comprises determining that an amount of outliers to the identified cluster is less than a threshold amount.

8. The method of claim 7, wherein the threshold amount is based on a ratio of points determined to be in a cluster to points determined not to be in a cluster.

9. The method of claim 1, wherein extracting the n-gram appearing in the plurality of web documents comprises:
   extracting n-grams of a plurality of different lengths and less than a threshold length from the web documents.

10. The method of claim 1, wherein identifying the neighborhood by identifying the cluster of geographic locations associated with the n-gram comprises:
    determining parameters of a clustering algorithm based on a geographic density associated with a geographic region including at least some of the geographic locations.

11. The method of claim 1, wherein identifying the neighborhood by identifying the cluster of geographic locations associated with the n-gram comprises:
    determining that the n-gram includes or is modified by a term associated with geographic locations in a language in which the n-gram is expressed.

12. The method of claim 1, comprising:
    receiving a search query including the name;
    identifying a geographic area defined by the boundary based on an association with the name in the geographic information system;
    ranking search results based on the geographic area;
    selecting an advertisement based on the name or the geographic area; and
    sending the advertisement and the search result.

13. A tangible, non-transitory, machine-readable medium storing instructions that when executed by a data processing apparatus cause the data processing apparatus to perform operations comprising:

extracting, via one or more processors, n-grams appearing in a plurality of web documents and being of less than a threshold word count:

obtaining a plurality of web documents, each web document being associated with a respective geographic location, the web documents including user reviews of local businesses associated with the respective geographic locations in the geographic information system,         extracting n-grams from each of the web documents;

associating, via the one or more processors, the n-grams with geographic locations associated with the web documents from which the n-grams were extracted, including associating each of the n-grams with a respective latitude and longitude coordinate of the web document from which the n-grams were extracted;

identifying, via the one or more processors, a neighborhood by identifying a cluster of geographic locations associated with the n-grams, including:

filtering from the n-grams stop-words,         filtering from the n-grams phrases occurring in the web documents less than a threshold amount,         filtering from the n-grams at least some n-grams that do not correspond with a cluster,         filtering from the n-grams at least some n-grams that correspond to more than a threshold amount of clusters,         filtering from the n-grams at least some n-grams that correspond to more than a threshold amount of geographic locations outside of a cluster;

determining, via the one or more processors, a boundary for the neighborhood from the distribution of geographical locations in the cluster, including determining a convex hull of the cluster by identifying geographic locations of vertices of a polygon that contains at least a substantial portion of the cluster;

determining, via the one or more processors, a name for the neighborhood from the n-gram, including:

designating the n-gram as a candidate name for the geographic area defined by the polygon,         identifying one or more candidate names for geographic areas at least partially overlapping the polygon,         ranking the candidate names based on an amount of times the name appears in the web documents and the size of the geographic areas at least partially overlapping the polygon, and         selecting the highest ranking candidate name as the name; and     adding, via the one or more processors, the name and boundary of the neighborhood to a geographic information system, including storing the name in memory in a record that associates the name with the geographic area defined by the boundary.

14. A system, comprising:

one or more processors; and memory storing instructions that when executed by the processors cause the processors to effectuate operations comprising:

extracting n grams appearing in a plurality of web documents and being of less than a threshold word count:

obtaining a plurality of web documents, each web document being associated with a respective geographic location, the web documents including user reviews of local businesses associated with the respective geographic locations in the geographic information system,         extracting n-grams from each of the web documents;

associating the n-grams with geographic locations associated with the web documents from which the n-grams were extracted, including associating each of the n-grams with a respective latitude and longitude coordinate of the web document from which the n-grams were extracted;

identifying a neighborhood by identifying a cluster of geographic locations associated with the n-grams, including:

filtering from the n-grams stop-words,         filtering from the n-grams phrases occurring in the web documents less than a threshold amount,         filtering from the n-grams at least some n-grams that do not correspond with a cluster,         filtering from the n-grams at least some n-grams that correspond to more than a threshold amount of clusters,         filtering from the n-grams at least some n-grams that correspond to more than a threshold amount of geographic locations outside of a cluster;

determining a boundary for the neighborhood from the distribution of geographical locations in the cluster, including determining a convex hull of the cluster by identifying geographic locations of vertices of a polygon that contains at least a substantial portion of the cluster;

determining a name for the neighborhood from the n-gram, including:

designating the n-gram as a candidate name for the geographic area defined by the polygon,         identifying one or more candidate names for geographic areas at least partially overlapping the polygon,         ranking the candidate names based on an amount of times the name appears in the web documents and the size of the geographic areas at least partially overlapping the polygon, and         selecting the highest ranking candidate name as the name; and     adding the name and boundary of the neighborhood to a geographic information system, including storing the name in memory in a record that associates the name with the geographic area defined by the boundary.

\* \* \* \* \*